(12) United States Patent
Rehm et al.

(10) Patent No.: US 7,862,051 B2
(45) Date of Patent: Jan. 4, 2011

(54) DIAPHRAGM CHUCK

(75) Inventors: Fritz Rehm, Oberteuringen (DE); Zoran Mojicevic, Friedrichshafen (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 1164 days.

(21) Appl. No.: 11/509,191

(22) Filed: Aug. 24, 2006

(65) Prior Publication Data

US 2007/0045970 A1 Mar. 1, 2007

(30) Foreign Application Priority Data

Aug. 25, 2005 (EP) .................................. 05018464

(51) Int. Cl.
*B23B 31/32* (2006.01)

(52) U.S. Cl. .................. 279/139; 279/124; 279/130

(58) Field of Classification Search ................ 279/2.05, 279/4.05, 124, 130, 139, 152; *B23B 31/32*
See application file for complete search history.

(56) References Cited

U.S. PATENT DOCUMENTS

| | | | |
|---|---|---|---|
| 2,719,721 A | | 10/1955 | Grobey |
| 2,993,473 A | | 7/1961 | Hohwart et al. |
| 3,087,737 A | | 4/1963 | Werth |
| 3,190,664 A | * | 6/1965 | Toth et al. .................. 279/4.05 |
| 4,645,219 A | * | 2/1987 | Link et al. .................. 279/130 |
| 6,145,850 A | * | 11/2000 | Rehm ......................... 279/139 |
| 6,880,831 B2 | * | 4/2005 | Taglang ..................... 279/4.05 |
| 2007/0235954 A1 | * | 10/2007 | Rehm ......................... 279/139 |

FOREIGN PATENT DOCUMENTS

| | | | |
|---|---|---|---|
| DE | 199 19 408 | | 5/2000 |
| JP | 2003011008 A | * | 1/2003 |
| JP | 2007015038 A | * | 1/2007 |

* cited by examiner

*Primary Examiner*—Eric A Gates
(74) *Attorney, Agent, or Firm*—Pandiscio & Pandiscio

(57) ABSTRACT

A diaphragm chuck assembly having clamping jaws disposed in a chuck body and in driven connection with a diaphragm deformable by an axially adjustable actuator, the clamping jaws having contact pieces, in which counterweights are disposed in recesses of the chuck body and the clamping jaws are clamped against the diaphragm by means of quick-clamping devices engaging in the contact pieces, the contact pieces being arranged in the diaphragm and in the counterweights with radial play. The clamping jaws are supported against a first surface extending axially in parallel to the chuck body in the clamping position and against a second reference surface extending at right angles to the first reference surface and into the diaphragm. The clamping jaws can be changed in a short time and the clamping jaws can be replaced without having to be reground.

8 Claims, 4 Drawing Sheets

DIAPHRAGM CHUCK

BACKGROUND OF THE INVENTION

1. Field of the Invention

The present invention relates to a diaphragm chuck with clamping jaws inserted in a chuck body and act on a workpiece to be clamped and are in a driven connection with a diaphragm that is located on a front face of the chuck body, attached to an outer area of the chuck body, and can be deformed by means of a centrally arranged, axially adjustable actuator, with counterweights assigned to clamping jaws located in recesses in the chuck body, and each of the clamping jaws designed as clamping heads being equipped with an offset contact piece that is axially arranged in the direction of the chuck body and runs approximately axially in parallel to the chuck body, the contact pieces being held in recesses worked into the counterweights, and the clamping jaws being clamped against the diaphragm and the counterweights by means of quick-clamping devices that engage in the contact pieces and act in the axial direction of the contact pieces.

2. Description of the Prior Art

A diaphragm chuck of this type is described in DE 199 19 408 B4 and has proven to be effective in practice. In this case, each of the clamping pieces of the clamping jaws is inserted and guided in a jaw carrier that is in a driven connection with the diaphragm, so the jaw carrier thereby follows the adjustment movements of the diaphragm. The clamping jaws of a chuck are ground in for the particular clamping position and for this reason the jaws can only be used with this chuck, assuming the specified precision is to be maintained. Accordingly, exchanging the clamping jaws from one chuck to another is only possible to a limited extent, if at all. Also, supplying new clamping jaws is not a straightforward procedure because they in turn have to be ground in for the chuck on which they are to be used. When a machining operation is modified, in which case the clamping jaws have to be ground out, this takes a lot of time and effort. What is more, the investment costs for stocking a large number of clamping jaws are considerable.

The task of the present invention is therefore to develop the diaphragm chuck of the aforementioned type in such a way that the clamping jaws do not have to be ground out in the clamping position of the chuck, but to enable them to be manufactured separately and machined to the precise dimensions. In this way, it should be possible to achieve a situation in which the clamping jaws are not dependent on a particular chuck, but can easily be exchanged between chucks and new jaws can be supplied for existing chucks, with the effect that the setup times can be significantly reduced and that workpieces can be machined at a favourable cost.

SUMMARY OF THE INVENTION

In accordance with the present invention, this is achieved in a diaphragm chuck of the type mentioned in the introduction in that the contact pieces of the clamping jaws or clamping heads are arranged in the diaphragm and the counterweights with radial play and in that the clamping jaws or clamping heads are directly supported against a first reference surface running axially in parallel to the chuck body in the clamping position and against a second reference surface that is worked onto the diaphragm at right angles to the first reference surface.

In this embodiment, in order to guarantee that the clamping jaws contact the first reference surface of the diaphragm precisely, it is advantageous for the clamping jaws or the clamping heads to be placed in contact with the first reference surface of the diaphragm by means of one or more axially arranged spring detents inserted in the diaphragm and/or the clamping jaws or clamping heads, and for the clamping jaws or clamping heads to be fixed onto the diaphragm by means of the quick clamping device.

This can be achieved in a straightforward manner in that each of the spring detents is composed of a detent pin arranged axially in parallel to the first reference surface of the diaphragm and inserted in a hole in the diaphragm or the clamping jaws or clamping heads that can be moved axially against the force of a spring, and of a recess with a conical tip assigned to the detent pin, the recess being worked into the counter surface opposite to the second reference surface of the diaphragm or into the second reference surface. Furthermore, in order to achieve a positive-locking connection, it is appropriate for the counterweights to be fixedly connected to the clamping jaws or clamping heads, this connection preferably taking the form of a screwed connection, and for each to be centred in associated recesses worked into the diaphragm by means of a collar formed centrally in relation to the contact pieces of the clamping jaws.

In order for the clamping jaws or clamping heads to be positioned easily in the circumferential direction, each of them should be provided with an outwardly projecting pin that engages in an axially aligned slot worked into the diaphragm.

Also the clamping jaws or clamping heads can be equipped with exchangeable reducing jaws that are attached to the clamping jaws or clamping heads, although it goes without saying that it is also possible for the clamping jaws to be made from a single piece.

In all embodiments of the clamping jaws, the clamping surfaces of the clamping jaws or the contact surfaces provided on the clamping heads for reducing jaws and their clamping surfaces should be arranged concentrically with the first reference surface when the diaphragm chuck is in its clamped position.

If a diaphragm chuck is configured in accordance with the present invention, not only does it offer the benefits associated with the diaphragm chuck of prior art, namely to enable the clamping jaws to be exchanged rapidly and extremely straightforwardly using quick-clamping devices without the need for special tools, but it is also possible to replace clamping jaws without the need for special work to be undertaken or for the clamping jaws to be reground. The diaphragm provides two reference surfaces in its clamped position in order to fix the clamping jaws or clamping heads in the radial and axial directions, which means that the clamping position defines a precise position—since the contact pieces are arranged in the diaphragm and in the counterweights with radial play—so that the clamping jaws or reducing jaws can be exchanged in a straightforward procedure. This means that specially produced clamping jaws can be used according to the machining operation in question.

Stocking of the clamping jaws is significantly simplified by the embodiment described here, and setup times are also reduced considerably. This means new clamping jaws can be supplied without problems and without the need for them to be reground for the chuck in this case. Nevertheless, the chuck configured in accordance with the present invention will always provide the same clamping position. This is because the clamping surfaces and the contact surfaces assigned to the clamping jaws or reducing jaws are arranged concentrically with one another when the diaphragm chuck is in its clamped position. In contrast to conventional diaphragm chucks, there are no specially formed jaw carriers, therefore a high degree of clamping accuracy can be achieved straightforwardly at all times and the range of applications for a diaphragm chuck of this type is significantly broader given the high level of repeat accuracy.

BRIEF DESCRIPTION OF THE DRAWINGS

The drawings show a sample embodiment of a diaphragm chuck configured in accordance with the present invention, the details of which are explained below. In the drawings.

DESCRIPTION OF THE PREFERRED EMBODIMENTS

Figure 1:
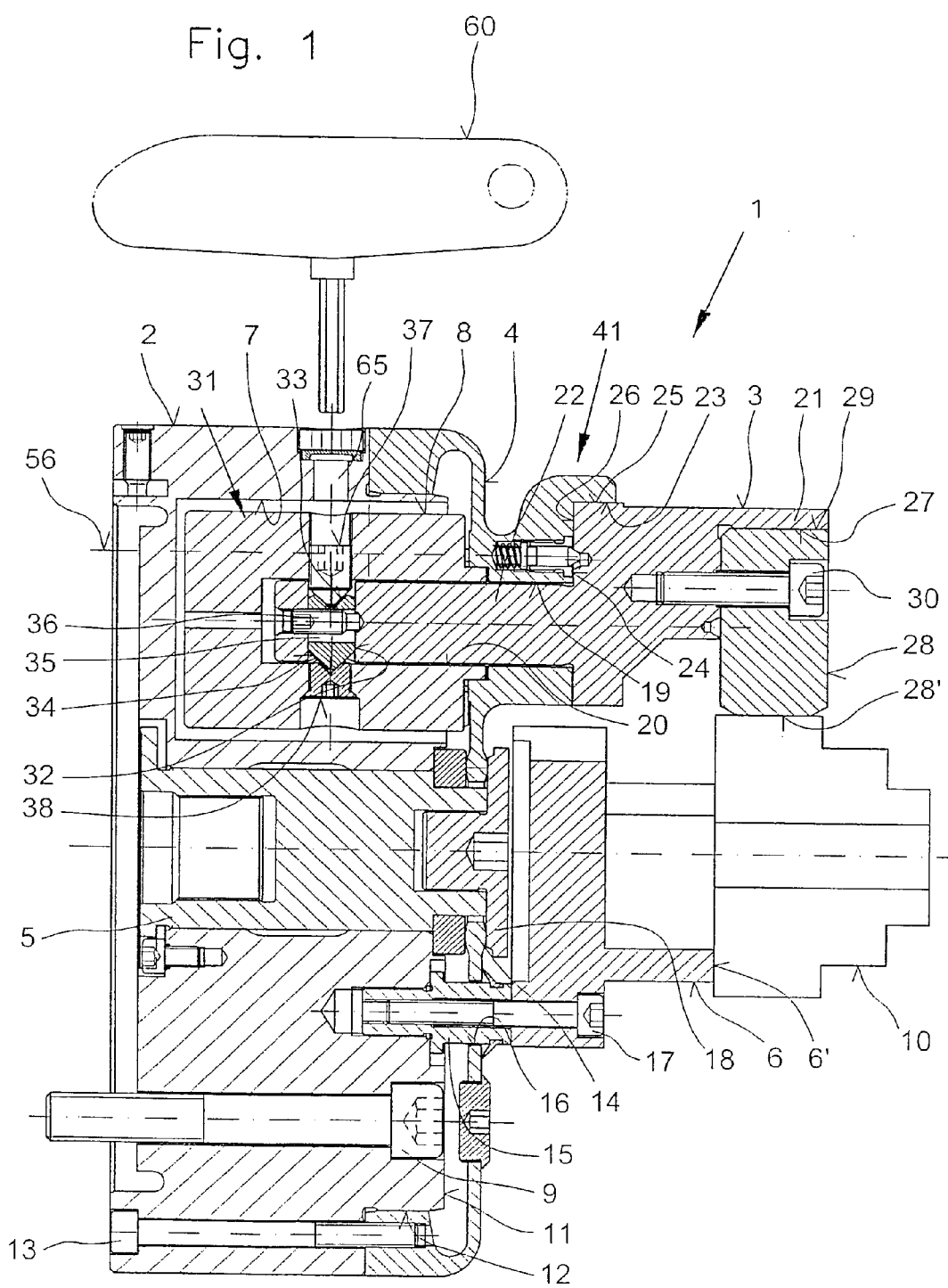
FIG. 1 shows a diaphragm chuck provided with counterweights, with a workpiece clamped in it, as an axial section.
Figure 2:
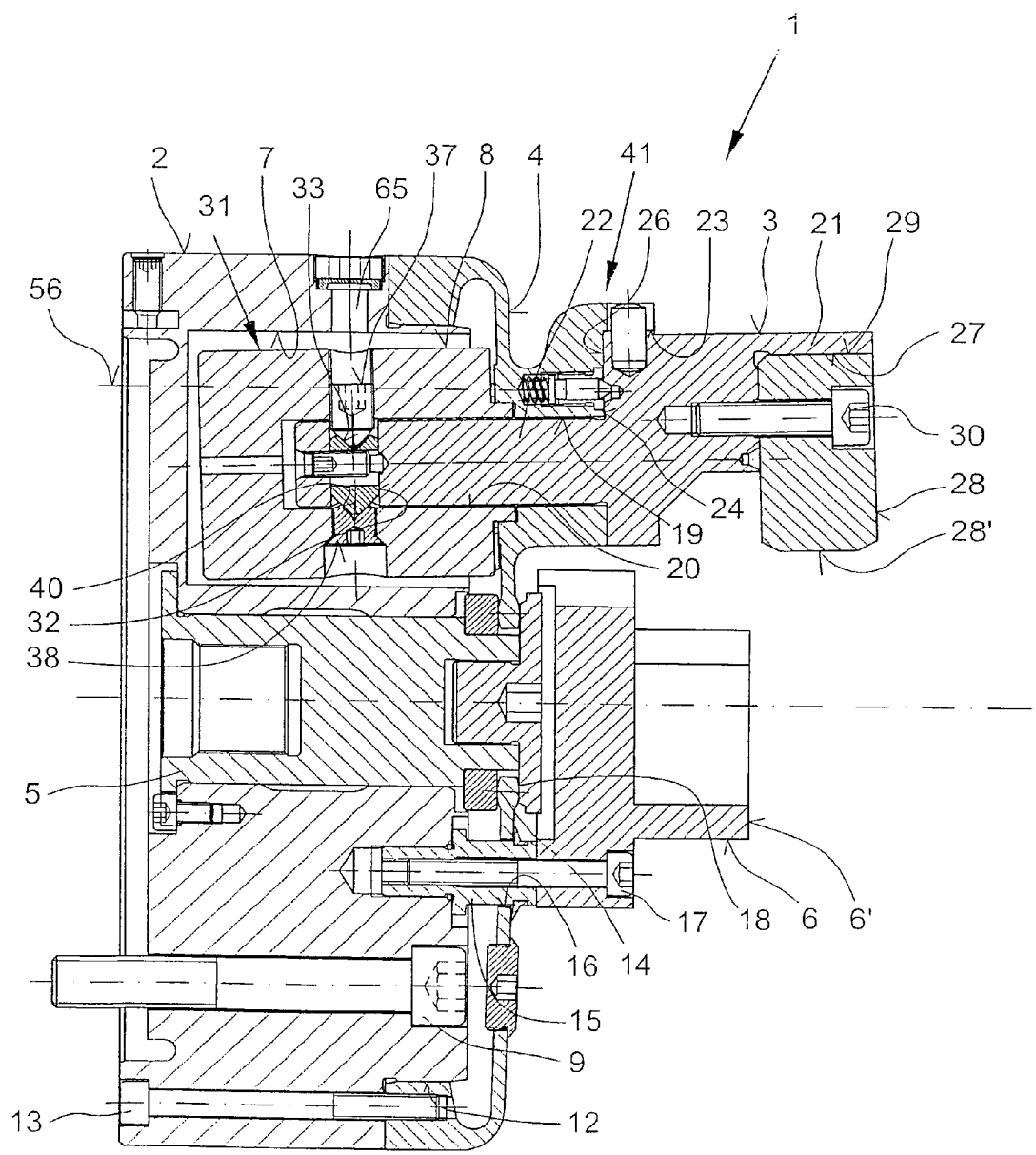
FIG. 2 shows the diaphragm chuck in accordance with FIG. 1 with open clamping jaws.

The diaphragm chuck shown in FIG. 1 and identified by 1 is used in particular for clamping high-quality workpieces 10, such as gears, and chiefly consists of clamping jaws 3 inserted in a chuck body 2 acting on the workpiece 10 that are in a driven connection with a deformable diaphragm 4 made from a metallic material that is attached on a front face 11 in a recess 12 in the outer area of the chuck body 2 by means of screws 13.

In order to actuate the diaphragm 4, a centrally arranged actuator 5 is provided into which an adjustable pull rod can be screwed by a servo device (not illustrated) on the end facing away from the clamping jaws 3. On the other end of the actuator 5, the diaphragm 4 provided with a crowned collar 14 is clamped by means of a disc 18.

Furthermore, counterweights 8 are inserted in recesses 7 worked into the chuck body 2 facing the clamping jaws 3 and these counterweights 8 counteract the centrifugal forces generated by the clamping jaws 3 when the diaphragm chuck 1 rotates, as well as allowing the clamping jaws 3 to be released using offset contact pieces 22 formed onto clamping heads 21 of the clamping jaws 3 with the help of quick-clamping devices 31, whilst nevertheless enabling a firm connection to be established. These contact pieces 22, which are, for example, formed as cylindrical shafts, pass through recesses 19 provided in the diaphragm 4 for this purpose and project into holes 20 worked into the counterweights 8 in which they can be locked by means of the quick-clamping devices 31.

Figure 4:
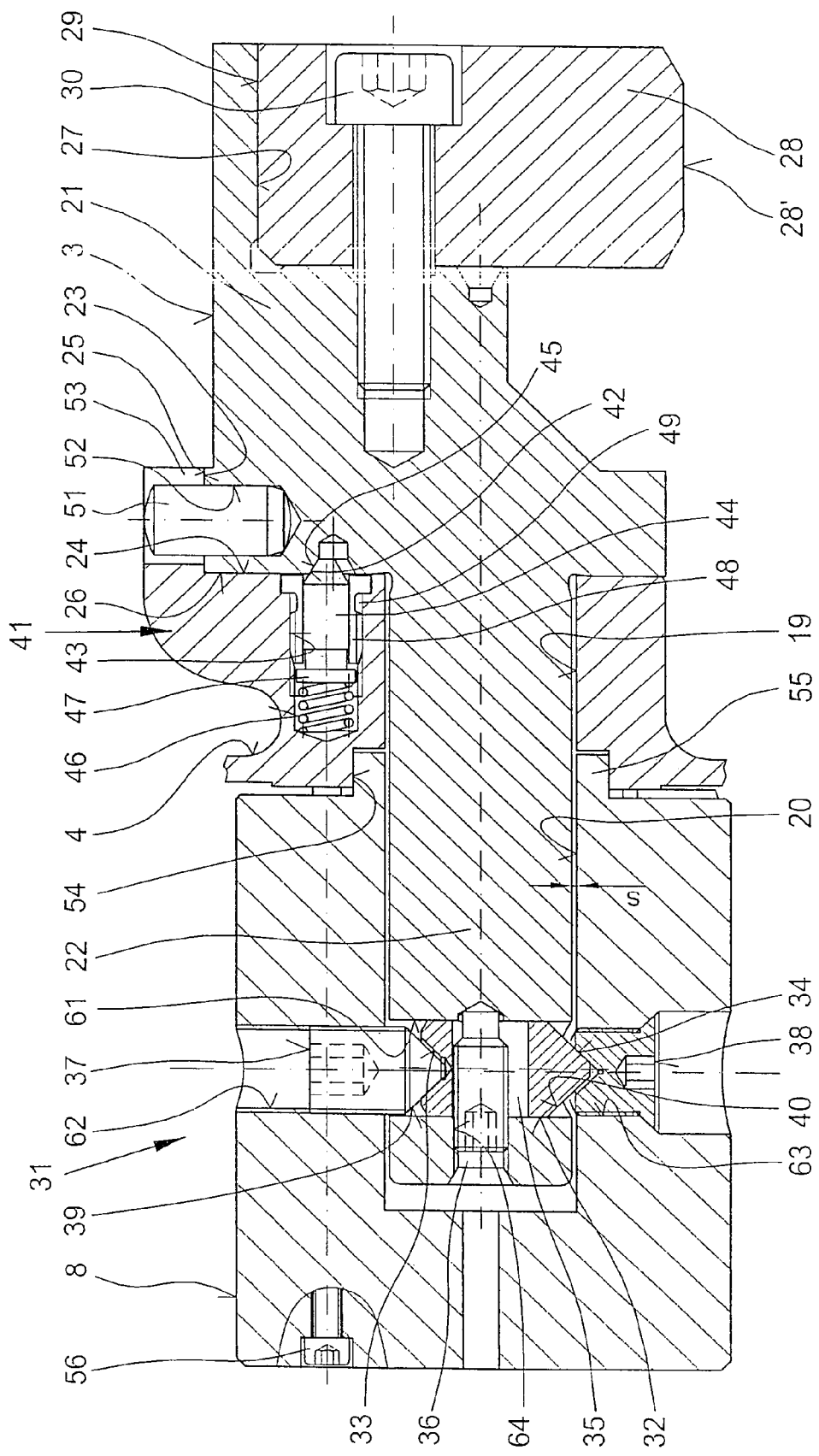
FIG. 4 shows a clamping jaw with counterweight as well as the associated components of the diaphragm chuck in accordance with FIG. 1, in a magnified view.

As is shown in FIG. 4 in particular, each of the quick-clamping devices 31 is formed by a pendulum pin 32 that can be moved in a limited radial arc and by two holding screws 37 and 38 that are installed in an axially offset position in relation to one another in order to generate a force acting in the axial direction of the contact pieces 22. For this purpose, the pendulum pins 32 are inserted in holes 61 worked into the contact pieces 22, whereas the holding screws 37 or 38 are screwed into threaded holes 62 or 63 worked into the counterweights 8. In addition, each of the pendulum pins 32 is provided with an internal cone 33 and an external cone 34 that interact with an external cone 39 or an internal cone 40 worked onto the holding screws 37 or 38. In order for the pendulum pins 32 to be held in the contact pieces 22, threaded holes 64 are worked into the contact pieces 22 and the pendulum pins 32 are provided with slots 35 into which pins 36 screwed into threaded holes 64 engage.

The quick-clamping devices 31 operate in such a way that when the holding screws 37 that can be accessed by means of holes 65 aligned with the threaded holes 62 and provided in the chuck body 2 are screwed, for example by means of an Allen key 60, into the internal cone 33 of the pendulum pins 32, the external cones 34 of these pins are braced against the internal cones 40 of the holding screws 38 with the result that the inclined surfaces generate a force acting in the axial direction of the contact pieces 22 and the clamping jaws 3 or their clamping heads 21 are pressed against the diaphragm 4. However, it is a prerequisite that the pendulum pins 32 are slightly axially offset in relation to the holding screws 37 and 38.

In order to support the clamping jaws 3 in the exact position on the diaphragm 4, the diaphragm 4 is provided with a first reference surface 23 and second reference surface 24 that are aligned at right angles to one another and in which the first reference surface 23 runs axially in parallel to the longitudinal axis of the diaphragm chuck 1 when the diaphragm chuck 1 is in its clamping position. In addition, the contact pieces 22 of the clamping heads 21 formed as shafts are arranged in the recesses 19 worked into the diaphragm 4 and in the holes 20 provided in the counterweights 8 with a low amount of play s, with the result that alignment with the first reference surface 23 is possible in a straightforward manner.

Automatic contact of the clamping heads 21 on the first reference surface 23 with a contact surface 25 is achieved by means of spring detents 41, by means of which the clamping heads 21 are pressed outwards and are fixed against this by means of the quick-clamping devices 31. At the same time, contact is made with the contact surface 26 on the reference surface 24 of the diaphragm 4.

In this case, as also shown in the magnified section of FIG. 4, the spring detents 41 consist of a pin 44 inserted in a hole 43 worked into the diaphragm 4 and a compression spring 46 acts on the pin 44, with a tapered tip 45 of the pin 44 engaging in a tapered hole 42 worked into the contact surface 26 of the clamping head 21 opposite to the second reference surface 24. The pin 44 is provided with a collar 47 and is adjustably mounted in a sleeve 48 that is screwed into the hole 43 provided with an internal thread 49. The force of the compression spring 46 therefore presses the clamping head 21 outwards against the first reference surface when the clamping jaws 3 are inserted, and the clamping head 21 is fixed in this position until the clamping jaws 3 are clamped with the diaphragm 4 by means of the quick-clamping devices 31.

In order to provide a positive connection between the counterweights 8 and the diaphragm 4, so that the counterweights 8 follow the movements of the diaphragm 4, the counterweights 8 are firmly screwed onto the diaphragm 4 by means of screws 56. In addition, recesses 54 assigned to the counterweights 8 are worked into the diaphragm 4 and each of the counterweights 8 is provided with a projection 55 that engages in the recesses 54 and is centred in it. The clamping jaws 3 and the counterweights 8 therefore form a single unit in the clamped position.

In order to enable the clamping jaws 3 to be aligned easily in the circumferential direction, pins 51 projecting radially outwards are provided on the clamping jaws 3 and these pins 51 are inserted into holes 52. Furthermore, the diaphragm 4 is provided with open slots 53 running in the axial direction and the pins 51 are inserted into these slots 53 during mounting of the clamping jaws. The position of each of the pins 51 is aligned in relation to the spring detents 41 with the effect that their pins 44 can engage in the holes 42 in a straightforward procedure.

In the illustrated embodiment, the clamping heads 21 of the clamping jaws 3 do not act directly on the workpiece 10, but instead the clamping heads 21 have reducing jaws 28 with a clamping surface 28' attached to them, in which case the contact surface 29 of the reducing jaws 28 make contact with the contact surfaces 27 of the clamping heads 21 and are attached to them by means of screws 30. This means the reducing jaws 28 can easily be replaced. It goes without saying that it is also possible to configure the clamping heads 21 as one-piece clamping jaws.

Figure 3:
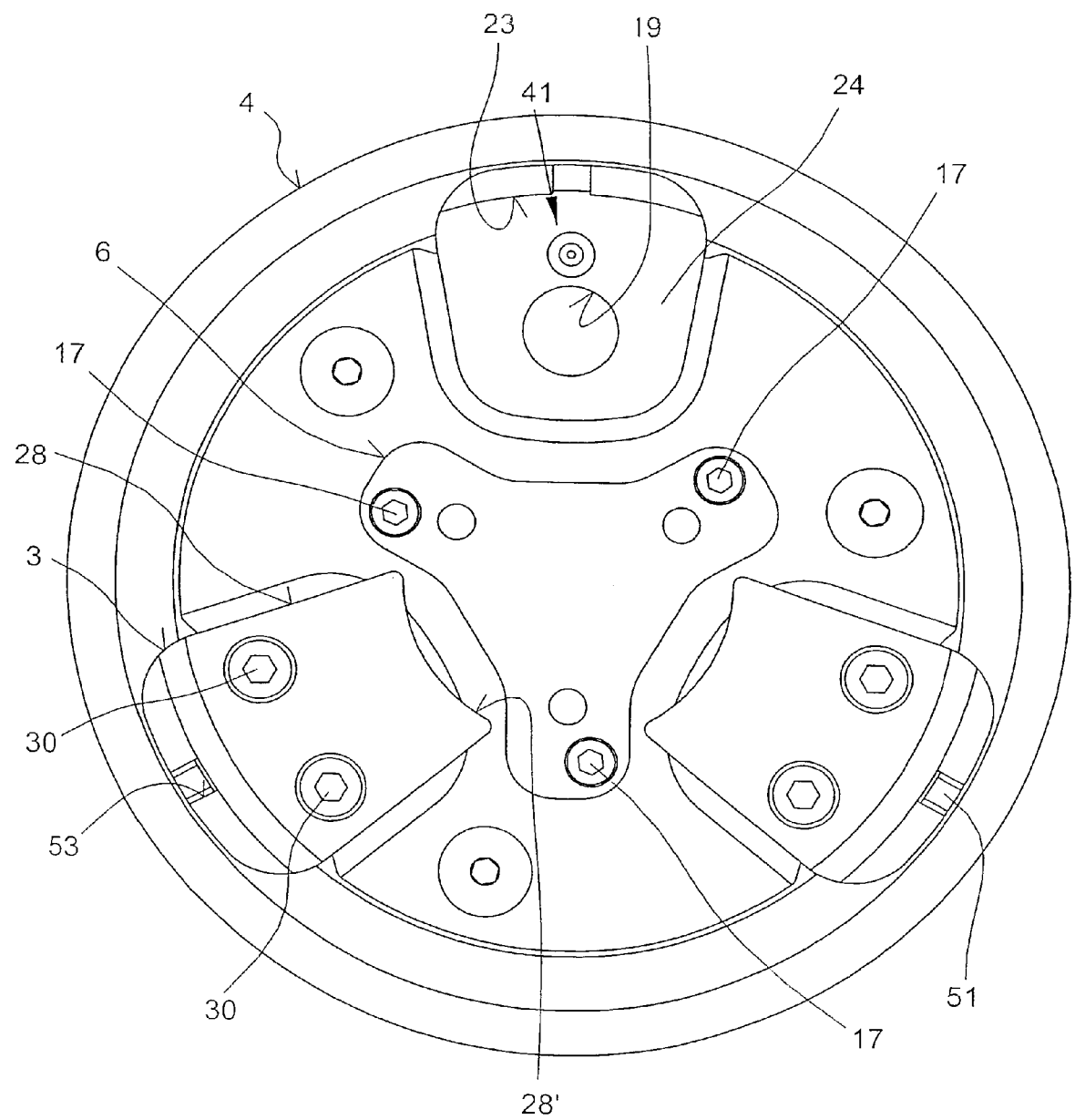
FIG. 3 shows the diaphragm chuck in accordance with FIG. 1 without and with clamping jaws inserted, as a front view

In order to support the workpiece 10, there is in addition a three-armed stop ring 6 attached to the chuck. As shown in FIG. 3, this ring projects in between the clamping jaws 3 and contact surfaces 6'. In order for the stop ring 6 to be held, sleeves 15 inserted in the chuck body 2 are provided that pass through recesses 16 correspondingly worked into the diaphragm 4. Screws 17 attach the stop ring 6 to the sleeves 15. The front face of the stop ring 6 is formed as the contact surface 6' for the workpiece 10. Additional screws 9 that can be accessed via holes worked into the diaphragm 4 and sealed by plugs secure the chuck body 2 of the diaphragm chuck 1 onto a machine tool.

Consequently, only the reference surfaces 23 and 24 have to be machined to accurate dimensions in the diaphragm chuck 1. The clamping jaws 3 and the reducing jaws 28, in contrast, can be specially produced and provided as selected. The contact surfaces 25 and 27 of the clamping heads 21 and the contact surface 29 of the reducing jaws 28 and their clamping surface 28' always run concentrically in relation to one another when the diaphragm chuck 1 is in its clamped position, which means it is possible to adapt the individual diameters of the contact surfaces to one another and to select the corresponding machining procedure accordingly without the reference surface 23 being influenced and without the need for any grinding in.

Nevertheless, a high level of clamping accuracy is always provided when different workpieces are clamped.

What is claimed is:

1. A diaphragm chuck assembly comprising:
   clamping jaws disposed in a chuck body and adapted to act on a workpiece to be clamped, said jaws being in a driven connection with a diaphragm located on a front face of the chuck body, and attached to an outer area of the chuck body,
   a centrally arranged, axially adjustable actuator engageable with said diaphragm to deform said diaphragm;
   counterweights assigned to said clamping jaws and located in recesses in the chuck body, each of said clamping jaws comprising a clamping head, each of said clamping heads being equipped with an offset contact piece axially arranged in a direction of the chuck body in parallel to the chuck body,
   the contact pieces being held in the recesses in said counterweights; and
   said clamping jaws being clamped against the diaphragm and said counterweights by quick-clamping devices that engage in the contact pieces and act in an axial direction of the contact pieces, wherein
   the contact pieces of said clamping heads are arranged in the diaphragm and in the counterweights with radial play, and
   said clamping heads are directly supported against a first reference surface extending axially in parallel to the chuck body in the clamping position and against a second reference surface of the diaphragm at right angles to the first reference surface.

2. The diaphragm chuck assembly in accordance with claim 1, wherein
   said clamping heads are adapted to be placed in contact with the first reference surface of the diaphragm by means of at least one axially arranged spring detent disposed at least in one of the diaphragm and said clamping heads, and wherein
   said clamping heads are fixed onto the diaphragm by means of the quick clamping devices.

3. The diaphragm chuck assembly in accordance with claim 2, wherein
   each of the spring detents comprises a detent pin arranged axially in parallel to the first reference surface of the diaphragm and disposed in a hole in at least one of the diaphragm and said clamping heads and is moveable axially against the force of a spring;
   and a recess with a conical tip for receiving the detent pin, the recess being disposed in one of a counter surface opposite to the second reference surface of the diaphragm and the second reference surface.

4. The diaphragm chuck assembly in accordance with claim 1, wherein
   the counterweights are fixedly connected to said clamping heads, the connection comprising a screwed connection.

5. The diaphragm chuck assembly in accordance with claim 1, wherein each of the counterweights is centered in an associated recess in the diaphragm by means of a collar formed centrally in relation to the contact pieces of the clamping jaws.

6. The diaphragm chuck assembly in accordance with claim 1, wherein each of the clamping heads is positioned in a circumferential direction by means of an outwardly projecting pin that engages in an axially aligned slot in the diaphragm.

7. The diaphragm chuck assembly in accordance with claim 1, wherein said clamping heads are provided with exchangeable reducing jaws that are attachable to the clamping heads.

8. The diaphragm chuck assembly in accordance with claim 1, wherein clamping surfaces of the clamping jaws, and the contact surfaces provided on the clamping heads for reducing jaws and their clamping surfaces, are arranged concentrically with the first reference surface when the diaphragm chuck is in a clamped position.

* * * * *